(12) United States Patent
Mies

(10) Patent No.: US 10,718,610 B2
(45) Date of Patent: Jul. 21, 2020

(54) ROUGHNESS MEASUREMENT PROBE, DEVICE WITH ROUGHNESS MEASUREMENT PROBE AND METHOD

(71) Applicant: Klingelnberg GmbH, Hückeswagen (DE)

(72) Inventor: Georg Mies, Wipperfürth (DE)

(73) Assignee: KLINGELNBERG GMBH (DE)

( * ) Notice: Subject to any disclaimer, the term of this patent is extended or adjusted under 35 U.S.C. 154(b) by 0 days.

(21) Appl. No.: 16/413,690

(22) Filed: May 16, 2019

(65) Prior Publication Data

US 2019/0353479 A1 Nov. 21, 2019

(30) Foreign Application Priority Data

May 16, 2018 (EP) ..................................... 18172550

(51) Int. Cl.
*G01B 11/30* (2006.01)
(52) U.S. Cl.
CPC .................................. *G01B 11/303* (2013.01)
(58) Field of Classification Search
CPC .................................................... G01B 11/303
See application file for complete search history.

(56) References Cited

U.S. PATENT DOCUMENTS

| 4,792,698 A * | 12/1988 | Pryor ................... | G01B 11/007 250/559.07 |
| 9,383,190 B1 * | 7/2016 | Shafer .................. | G01B 11/005 |
| 2009/0303068 A1 * | 12/2009 | Arai ........................ | G01B 9/04 340/686.1 |
| 2011/0277543 A1 * | 11/2011 | Mies ........................ | G01B 5/28 73/105 |

FOREIGN PATENT DOCUMENTS

| EP | 2199732 B1 | 10/2017 |
| EP | 3228974 A1 | 10/2017 |
| WO | 2010079019 A2 | 7/2010 |

* cited by examiner

*Primary Examiner* — Steven Whitesell Gordon
(74) *Attorney, Agent, or Firm* — McCarter & English, LLP

(57) ABSTRACT

Roughness measurement probe (15) for scanning a surface (F), comprising an integratingly operating device (20) and an optical scanning device (30), wherein the optical scanning device (30) is arranged directly on or in the integratingly operating device (20), wherein the integratingly operating device (20) is designed, when scanning the surface (F), to predetermine a mean distance between the roughness measuring probe (15) and a larger region of the surface (F), and wherein the optical scanning device (30) is designed, when scanning the surface (F), to optically scan a smaller region of the surface (F) in a contactless manner, wherein the integratingly operating device (20) comprises an optical arrangement which is designed as a virtual skid in such a way that it images a light spot (LF) on the surface (F).

10 Claims, 8 Drawing Sheets ured probe and a corresponding method.
ROUGHNESS MEASUREMENT PROBE, DEVICE WITH ROUGHNESS MEASUREMENT PROBE AND METHOD

CROSS-REFERENCE TO RELATED APPLICATIONS

This application claims the benefit under 35 U.S.C. § 119(e) to European patent application no. EP 18 172 550.8 filed May 16, 2018, which is hereby expressly incorporated by reference as part of the present disclosure.

FIELD OF THE INVENTION

The disclosure generally relates to a roughness measurement probe, a device incorporating such a roughness meas

BACKGROUND

In many technical areas, the surface structure of a component or material is an important quality feature.

There is therefore a large variety of roughness measuring devices for measuring the roughness or roughness depth of surfaces. Typically, mechanical scanning is carried out in which a probe tip is guided over the surface. The result is a height signal recorded over the tactile path, also known as a surface profile.

Skid probes 1 are known, as shown in FIG. 1 in schematic form. A skid probe 1 has a skid 2 which has a large or small radius depending on the application and which serves as a sliding element. The probe tip 4 of a probe 3 rests with the skid 2 on a surface F to be measured and measures the surface profile relative to the path of the skid 2 with the probe tip 4. During the measurement, the skid 2 follows the macroscopic unevenness of the surface F, i.e., the waviness and macroscopic shape. The probe tip 4, on the other hand, records the surface roughness with its small tip radius and detects grooves, for example, which were bridged by the skid 2, as this has a much larger effective radius. The skid 2 thus acts as a kind of mechanical high-pass filter.

From the published patent application WO 2010079019A2 (see also EP patent EP 2199732 B1) another skid probe is known. This skid probe is shown in FIG. 2A in a corresponding function view. To be able to compare the skid probe of FIG. 2A with the solution of FIG. 1, the same reference numerals were used here. The sliding element 2 is located at the extreme end of a stylus. A probe with the probe tip 4 is integrated in the stylus, wherein the distance A between the sliding element 2 and the probe tip 4 is fixed.

Another skid probe 1 is shown in FIG. 2B. The skid probe 1 of FIG. 2B is based on the basic principle of FIG. 2A. In contrast to FIG. 2A, however, the sequence of probe tip 4 and sliding element 2 is reversed. In the example shown in FIG. 2B, the probe tip 4 is in front of sliding element 2. Here too, the distance A between sliding element 2 and probe tip 4 is predetermined in a fixed manner.

Skid probes can deliver partially falsified results. This is the case, for example, if the movement of the skid 2 is superimposed constructively on the movement of the probe tip 4 and a too large output signal is supplied, or if the movements are completely or partially cancelled and a too small signal is thus supplied.

Other problems occur, for example, when measuring the surface properties of tooth flanks. On the one hand, the existing skid probes are not suitable for immersing far into the tooth gaps of small-module gears. On the other hand, sliding element 2 runs free when the tooth crest of a tooth flank is reached. As a result, the topography of tooth flanks cannot be measured close to the tooth crest. A solution according to FIG. 2A is not suitable as the probe tip 4 runs free when reaching the tooth crest. In the case of a solution according to FIG. 2B, on the other hand, the skid 2 would run free when reaching the tooth crest.

From the published patent application EP 3228974 A1 a roughness measurement probe is known, which includes a lateral skid. A corresponding roughness measurement probe 1 is shown in FIGS. 2C and 2D. FIG. 2C shows a side view and FIG. 2D shows the front area of the roughness measurement probe 1 diagonally from below. This roughness measurement probe 1 comprises a lateral skid 5 and a probe tip 4. The probe tip 4 is located in the area of the extreme end of a probe arm 6. The skid 5 is located laterally as close as possible to the probe tip 4, i.e. the skid 5 and the probe tip 4 are both in the same plane SE (cf. FIG. 2C).

Due to the very small tip radius of the probe tips 4, which are used in the previously known probe systems, these are relatively sensitive and therefore tend to wear or, if uncontrolled movements are carried out, become destroyed.

In addition, the prior known probe systems cannot be used in all situations, as they cannot be guided into corners or edges due to their size.

SUMMARY

It is therefore an objective to provide a roughness measurement probe, which enables roughness measurements to be performed even on small-module gears and other 3-dimensional structures, wherein the surface is to be measured quickly and with high accuracy.

In addition, it is an objective to provide a (measuring) device with a suitable roughness measurement probe, which makes it possible to carry out improved automated roughness measurements, e.g., on gear flanks. Furthermore, it is an objective to provide the method of using such a roughness measurement probe.

A roughness measurement probe according to at least some embodiments comprises an integratingly operating device and an optical scanning device, wherein the optical scanning device is located directly on or in the integratingly operating device.

The roughness measurement probe, in at least some embodiments, is designed for scanning a surface and comprises an integratingly operating device and an optical scanning device. The optical scanning device is located directly on or in the integratingly operating device. The integratingly operating device is designed to provide a mean distance between the roughness measurement probe and a larger area of the surface when scanning the surface. The optical scanning device, on the other hand, is designed for non-contact optical scanning of a smaller area of the surface.

In at least some embodiments of the roughness measurement probe, the integratingly operating device comprises a skid, wherein said skid may be a skid having a curved sliding surface.

In at least some of the embodiments of the roughness measurement probe equipped with a skid, the skid includes an aperture. In addition, the optical scanning device is arranged with respect to the skid so as to be capable of emitting a light beam through the skid and aperture in the direction towards the surface. This configuration is relatively compact and can therefore measure small structures quickly and accurately.

In at least some embodiments of the roughness measurement probe equipped with a skid, the skid comprises a light guide or light channel adapted to emit a light beam of the optical scanning device through the skid in the direction towards the surface. It is an advantage of this constellation (configuration) that the light source (e.g., a laser) can be arranged lying in a scanning arm and that the light guide or light channel can be used to deflect the light beam in the direction of the surface.

In at least some embodiments of the roughness measurement probe, the integratingly operating device comprises an optical arrangement which is designed as a virtual skid in such a way that it images at least one light spot on the surface. In these embodiments there is no contact between the roughness measurement probe and the surface. These devices thus work completely contactless.

In at least some embodiments of the roughness measurement probe which comprise a virtual skid, the optical arrangement is adapted to image at least two light spots on the surface such that a reference line or plane of the roughness measurement probe is equidistantly positionable.

In at least some embodiments of the roughness measurement probe which comprise a virtual skid with at least two light spots, multiple NC-controlled axes and a controller are present, which allow maintaining an equidistant position of the reference line or plane relative to the surface.

In at least some embodiments of the roughness measurement probe which comprise a virtual skid, the optical scanning device is designed to optically scan the smaller area of the surface without contact after equidistant positioning.

In at least some embodiments of the roughness measurement probe which comprise a virtual skid, a regulator (controller) is provided which maintains an equidistant position when the roughness measurement probe is moved relative to the surface.

In at least some embodiments, the roughness measurement probe comprises an optical scanning device configured as a chromatic confocal sensor device comprising a light source for emitting white light, a lens array for differently focusing different wavelength ranges of the white light, and a spectrometer for evaluating light of at least one wavelength reflected from the surface. Such a roughness measurement probe is compact.

In at least some embodiments, the roughness measurement probe comprises an optical scanning device which is designed according to the triangulation principle and which comprises a (laser) light source for emitting a light beam and a spaced-apart detector for receiving a light beam which has been reflected from the surface.

In at least some embodiments, the roughness measurement probe comprises an optical scanning device designed to emit a light beam in a direction extending perpendicularly or obliquely to a longitudinal axis of the roughness measurement probe. Such an embodiment is compatible with the roughness measurement probes mentioned above, which are pulled or pushed flat or at a slight angle over the surface.

In at least some embodiments, the roughness measurement probe comprises an optical scanning device adapted to emit a light beam in a direction parallel to a longitudinal axis of the roughness measurement probe. Such an embodiment can be guided over the surface like a stylus.

An exemplary coordinate measuring system comprises a roughness measuring probe for at some embodiments. The coordinate measuring system also includes at least one NC-controlled axis for moving the roughness measurement probe relative to the surface of a component.

In at least some embodiments, a roughness measurement is used to measure the surface roughness of the tooth flanks of gears, wherein a light beam of the optical scanning device is transmitted in the direction of one of the tooth flanks and reflected back there in the direction of the optical scanning device.

At least some embodiments can be used in conjunction with 1D, 2D and 3D measuring devices.

This summary is not exhaustive of the scope of the aspects and embodiments of the invention. Thus, while certain aspects and embodiments have been presented and/or outlined in this summary, it should be understood that the inventive aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow, but in any case are not exhaustive or limiting.

It should also be understood that any aspects and embodiments that are described in this summary and elsewhere in this application and do not appear in the claims that follow are preserved for later presentation in this application or in one or more continuation patent applications.

BRIEF DESCRIPTION OF THE DRAWINGS

Exemplary embodiments of the invention, which are understood not to be limiting, are described in more detail below with reference to the drawings.

DETAILED DESCRIPTION

In connection with the present description, terms are used which are also used in relevant publications and patents. It should be noted, however, that the use of these terms is for convenience only. The inventive idea and the scope of protection of the patent claims shall not be restricted in interpretation by the specific choice of terms. The invention can easily be transferred to other conceptual systems and/or fields. The terms are to be used analogously in other specialist areas.

The term "roughness" is used here to describe the surface quality of a surface F. The roughness is rather limited to microscopic, in the sense of selective or local statements. Typically, structures, elements and characteristics of a surface F are concerned in respect of roughness, which have a size in the range from nm to approx. 500 μm. In at least some embodiments, this involves measuring the surface of the tooth flanks of gears 11 and similar components.

Figure 3:
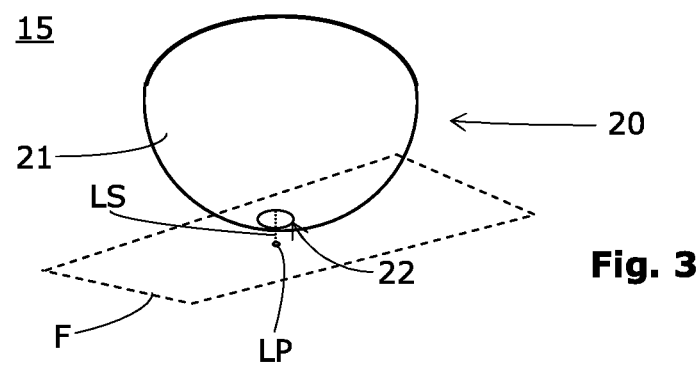
FIG. 3 schematically shows a perspective view the front section of a roughness measurement probe.

FIG. 3 shows details of a first embodiment of a roughness measurement probe 15, which is specially designed for scanning a surface F. The roughness measurement probe 15 comprises an integratingly operating device 20 and an optical scanning device 30. The optical scanning device 30 is not shown in FIG. 3 however, because it is located inside the integratingly operating device 20. The surface F to be scanned is shown here as a transparent plane from diagonally below.

Figure 4:
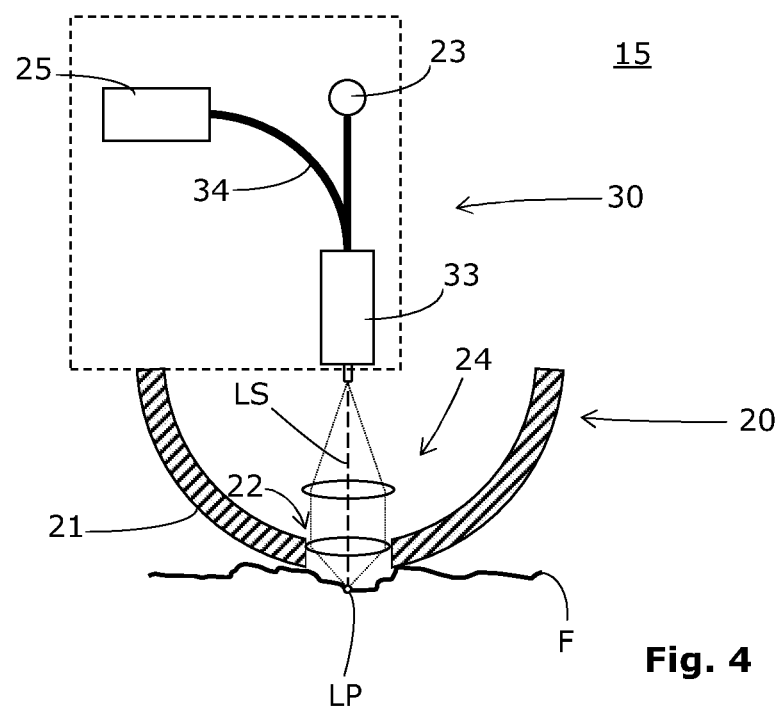
FIG. 4 schematically shows an enlarged sectional view of the front section of a roughness measurement probe, wherein said roughness measurement probe comprises a chromatic confocal sensor device.
Figure 7A:
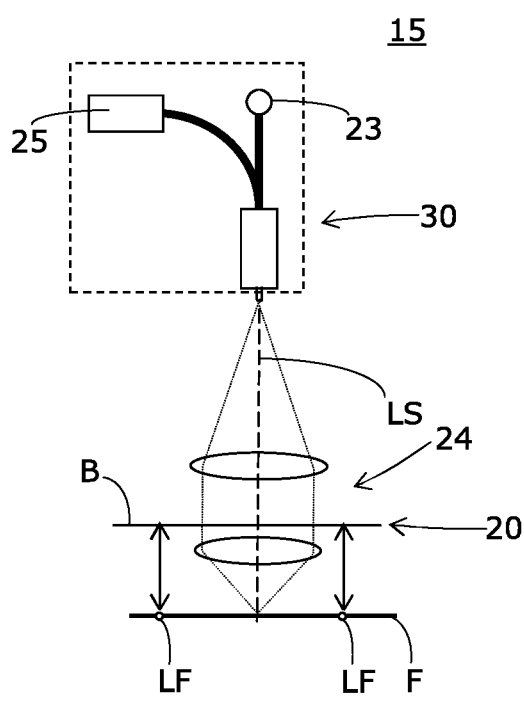
FIG. 7A schematically shows a roughness measurement probe comprising a chromatic confocal sensor device and a virtual skid.
Figure 7B:
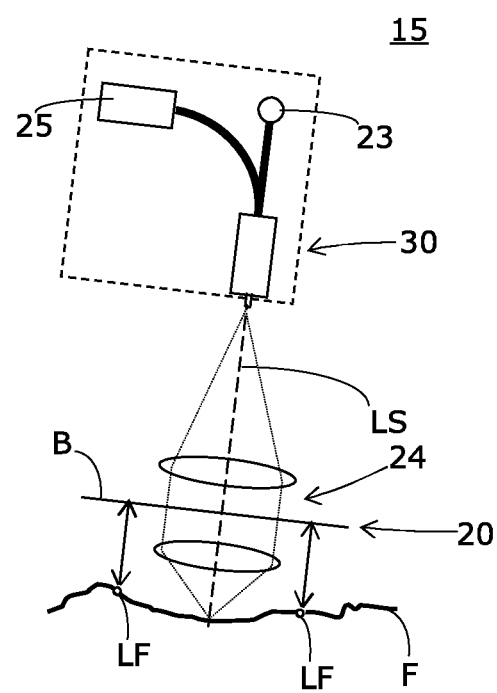
FIG. 7B schematically shows the roughness measurement probe of FIG. 7A in a different position.

In at least some embodiments, the integratingly operating device 20 is a device designed to provide a mean distance between the roughness measurement probe 15 and a larger area of the surface F when scanning the surface F. In FIG. 4, it can be seen from an enlarged schematic representation that the surface F comprises a roughness with macroscopic and microscopic details or artifacts. FIGS. 7A and 7B illustrate how the integratingly operating device 20 can define an equidistant position.

Figure 6:
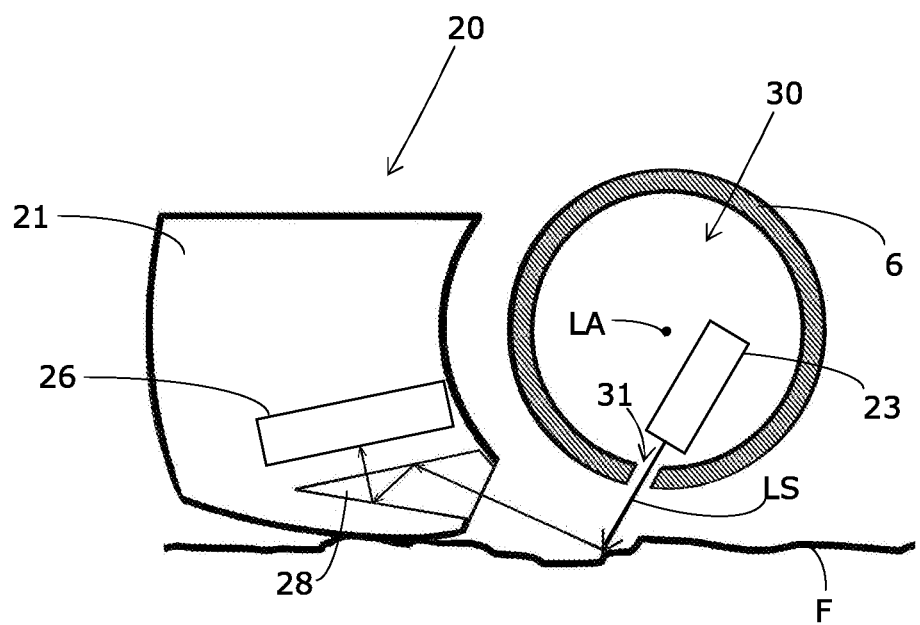
FIG. 6 schematically shows a cross-sectional view of the front part of a roughness measurement probe which works according to the triangulation principle.

An integratingly operating device 20, if it is designed as a mechanically acting skid 21, as shown in FIGS. 3 and 4 by means of a hemispherical sliding element and in FIG. 6 by means of a sliding element 21 with a curved sliding surface, lies on the macroscopic details or artifacts of surface F due to its 3-dimensional extension (see FIG. 4 and FIG. 6).

At least some embodiments comprise a mechanically acting skid 21 to provide an integrating effect with respect to the relative distance between the roughness measurement probe 15 and the surface F. The function of a skid 21 is in principle known from the publications mentioned above and is not explained in detail here. A person skilled in the art knows the function and evaluation of a signal if a signal transmitter is assigned to the skid 21.

At least some embodiments include a virtual skid 21, as will be described later by reference to embodiment examples.

The integratingly operating device 20 is designed for at least some embodiments in such a way that it specifies a mean distance between the roughness measurement probe 15 and a larger area of the surface F. This mean distance results quasi from the macroscopic details or artifacts of the surface F. Instead of a mean distance, an equidistant position is also referred to.

At least some embodiments comprise an optical scanning device 30 disposed directly on or in the integratingly operating device 20. FIGS. 3 and 4 show embodiments in which the optical scanning device 30 (at least partially) is arranged in the device 20. FIG. 6 shows an embodiment in which a part (here a detector 26) of the optical scanning device 30 is arranged in the skid 21.

The optical scanning device 30 is specially designed to optically scan a smaller area of the surface F without contact. When reference is made to "larger areas" and "smaller areas" in this context, this refers primarily to relative details. The smaller area is smaller than the larger area. The contactless, optical scanning of the smaller area with the optical scanning device 30 enables selective or local statements relative to the instantaneous position of the integratingly operating device 20.

The contactless, optical scanning of the smaller area with the optical scanning device 30 enables the acquisition of details or artifacts with a size in the range from nm to approx. 500 μm.

The integratingly operating device 20, on the other hand, works in the range of μm and larger.

In at least some embodiments, roughness measurement probe 15 comprises a skid 21 as part of the integratingly operating device 20. In at least some embodiments, this skid 21 has a curved sliding surface as shown in FIGS. 3 and 4 by means of a spherical sliding surface and in FIG. 6 by means of a 3-dimensionally curved sliding surface.

In at least some embodiments, the skid 21 has a curved transverse profile in a cross-sectional plane. Such a solution shows an effective integration effect and good sliding behavior.

In at least some embodiments, the skid 21 has a curved longitudinal course in a longitudinal plane. Such a solution shows an effective integration effect and good sliding behavior.

In at least some embodiments, the skid 21 includes an aperture 22, as shown in FIGS. 3 and 4. In this case, the optical scanning device 30 is arranged in relation to the skid 21 in such a way that it is able to emit a light beam LS through the skid 21 and the aperture 22 in the direction of the surface F.

FIG. 3 shows only a medium light beam LS, which forms a light point LP on the surface F. The reflected light beam is not shown separately.

FIG. 4 shows the basic principle of a chromatic confocal sensor device comprising a light source 23 for emitting white light. Furthermore, the sensor device comprises a lens arrangement 24 (e.g. with a collimator lens and a second lens which focuses the different wavelengths of the white light into different focal points). The sensor device also includes a spectrometer 25 for evaluating light of at least one wavelength reflected from the surface F.

Such a chromatic confocal sensor device emits white light in the direction of the collimator lens. There the light rays are converted into parallel rays. The second lens produces a spatial separation of the different wavelengths of white light, wherein each wavelength range has its own focal point FP. The focal length of the blue light component is shorter than the focal length of the green light component, which in turn is shorter than the focal length of the red light component.

In principle, the wavelength reflected at the surface F is predominantly the wavelength whose focal length corresponds to the distance between the lowest point of the skid 21 and a local point of the surface F. At a small relative distance ΔA, for example, the blue part of the light is predominantly reflected.

The reflected light component is sent back through the lens arrangement 24 in the direction of a coupler 33. There, the reflected light portion is guided via an optical fiber 34 to a spectrometer 25. The spectrometer 25 is designed to determine in which wavelength range the greatest light intensity was reflected back. The relative distance ΔA can be determined on the basis of the maximum light intensity. ΔA denotes the relative distance between a reference line or reference plane B of the roughness measurement probe 15. For a mechanical skid 21, the reference line or reference plane B is determined by the instantaneous position of the skid 21 relative to the surface F. With a virtual skid 21, the reference line or reference plane B is kept in an equidistant position relative to the surface F by a controller.

In a chromatic confocal sensor device, the wavelength of the light component currently in focus virtually codes the relative distance ΔA.

Such an optical scanning device 30, which is based on the chromatic confocal principle, can achieve a resolution in the range between 0.01 and 0.1 μm. An optical scanning device 30, based on the chromatic confocal principle, can measure relative distances ΔA between 0.01 and 1 μm. In this range of resolution, accuracies between 0.03 to 1 μm can be achieved.

When measuring according to the chromatic confocal principle, it is important that the light beam LS does not hit the surface F to be measured too flat. In the constellation (configuration) shown in FIG. 4, the light beam LS impinges with a very steep angle (if the surface F is exactly flat and perpendicular to the light beam LS).

In at least some embodiments based on the chromatic confocal principle, the integratingly operating device 20 is guided (pulled or pushed) over the surface F or positioned towards the surface F in such a way that the angle between the surface F and the light beam LS is at least 30 degrees.

Figure 5:
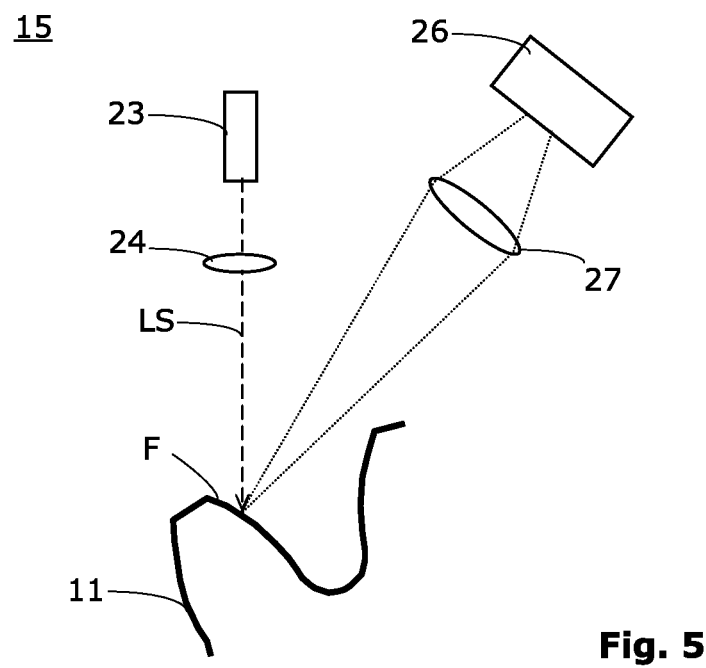
FIG. 5 schematically shows a roughness measurement probe which works according to the triangulation principle.

An optical scanning device 30 based on the triangulation principle is used in at least some embodiments. FIG. 5 shows an example of an embodiment in a schematic form, wherein the integratingly operating device 20 is not shown in this representation.

An optical scanning device 30, based on the triangulation principle, comprises a light source 23 (e.g., a laser source) and a lens arrangement 24 (here realized by a single lens), which focuses a light beam LS onto the surface F. FIG. 5 shows a section of a gear or component 11, one flank of which is referred to as surface F. A part of the light beam LS is reflected at the surface F in the direction of a detector 26. Here, too, a lens or a lens arrangement 27 can be used to bundle the reflected light rays (the course of which is shown dotted here) in the direction of detector 26. The relative distance ΔA can be determined from the position of the light beams arriving at the detector 26 and from the known position of the detector 26 relative to the light source 23.

FIG. 6 shows a roughness measurement probe 15 comprising a lateral skid 21 as part of the integratingly operating device 20. Furthermore, this roughness measurement probe 15 comprises an optical scanning device 30 based on the triangulation principle. The light source 23 of the optical scanning device 30 is shown here by a rectangular block inside a hollow scanning arm 6. The light source 23 may be arranged in the longitudinal direction (defined by a longitudinal axis LA) of the hollow scanning arm 6 and a mirror or prism can be used to deflect the light beam LS so that it leaves the scanning arm 6 through an aperture 31 and hits the surface F. In the scanning device 30 shown in FIG. 6, the light source 23 is located diagonally inside the hollow scanning arm 6. The light source 23 directs the light beam LS onto the surface F. At the surface F, the light beam LS is reflected and deflected in the direction of a detector 26, which is integrated here into a laterally arranged skid 21.

The skid 21 comprises a prismatic optical element 28 whose shape and reflection behavior is designed in such a way that the light beam is reflected in the direction of the detector 26 by multiple internal reflections.

In the representation shown in FIG. 6, the longitudinal axis of the roughness measurement probe 15 (defined here by the longitudinal axis LA of the hollow scanning arm 6) is perpendicular to the drawing plane. The roughness measurement probe 15 is moved into the drawing plane (pulling movement) or out of the drawing plane (pushing movement) to scan the surface F.

Figure 1:
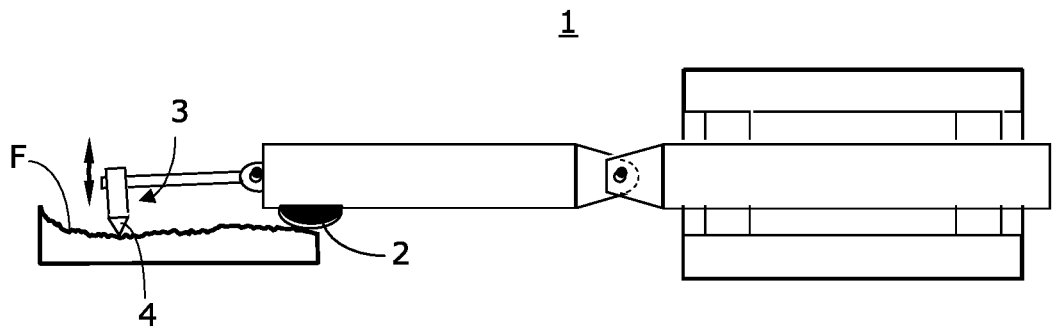
FIG. 1 schematically shows a known skid measuring device.
Figure 2A:
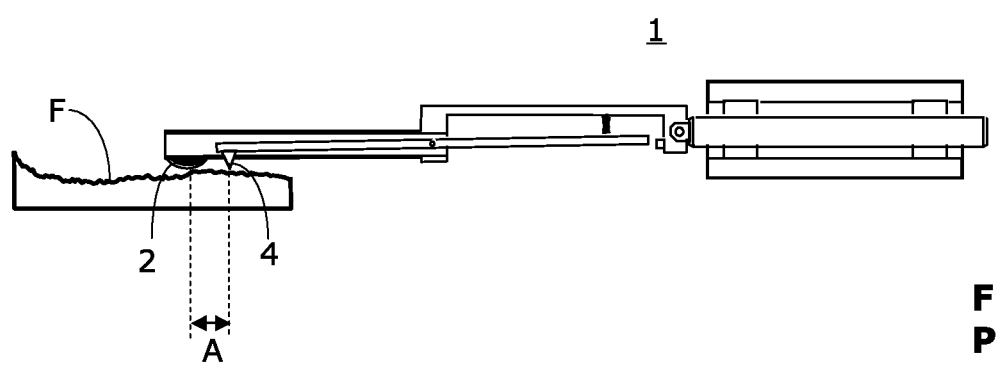
FIG. 2A schematically shows a known skid measuring device.
Figure 2B:
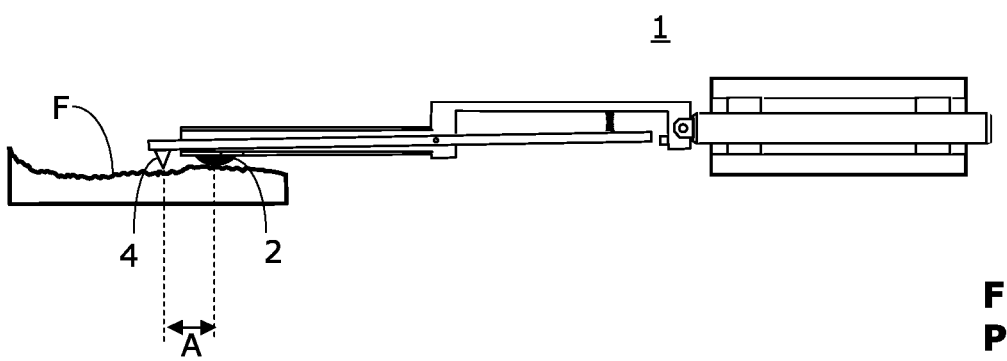
FIG. 2B schematically shows another skid measuring device based on the approach of FIG. 2A.
Figure 2C:
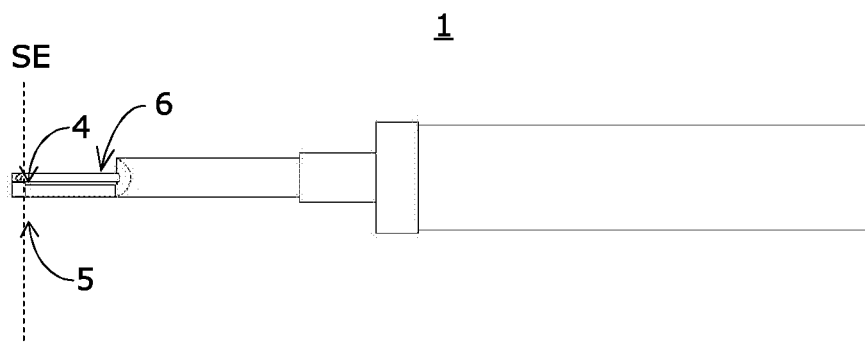
FIG. 2C schematically shows a known roughness measurement probe with lateral skid.
Figure 2D:
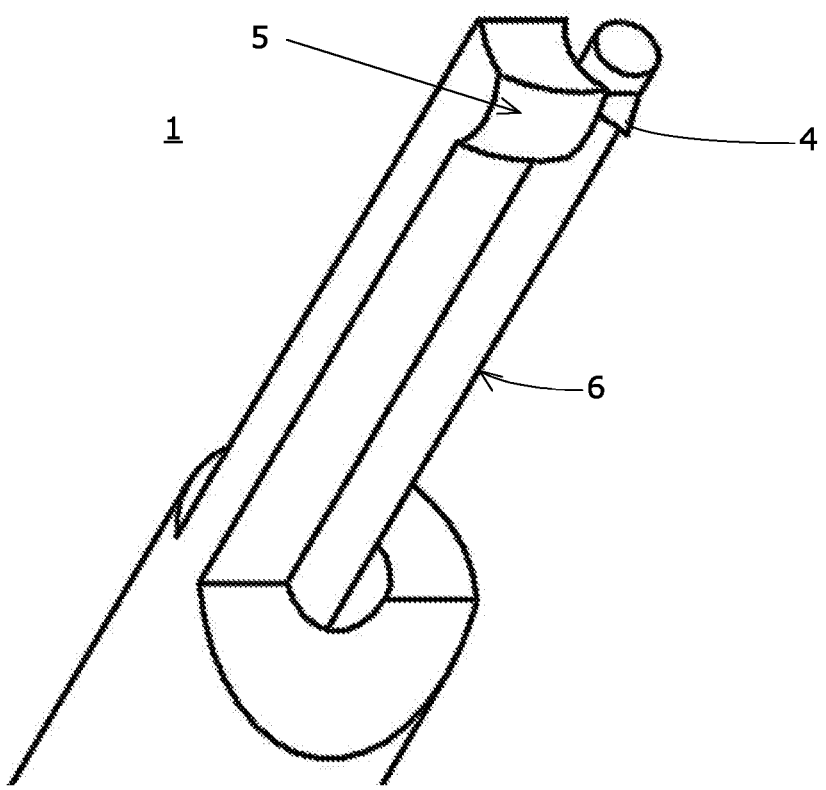
FIG. 2D shows a perspective view of the front part of the roughness measurement probe of FIG. 2C.

The embodiment shown in FIG. 6 can, for example, be integrated into a roughness measurement probe 15 of FIG. 2D, wherein in this case an aperture 31 is provided for the light beam LS instead of the probe tip.

The roughness measurement probe 15 may comprise an integratingly operating device 20 comprising an optical array. This optical arrangement is referred to here as the virtual skid. This optical arrangement is designed in such a way that at least one light spot LF is imaged on the surface F.

In at least some embodiments, the light spot LF is clearly larger than the light point LP produced by the optical scanning device 30.

In at least some embodiments, the light spot LF and the light point LP are generated on the same area of the surface F, wherein the light point LP is located within the light spot LF and covers a smaller area than the light spot LF. In order to be able to optically separate the two light beams if the light point LP is located within the light spot LF, different wavelengths can be used, for example, which can be cleanly separated.

Two or three light spots LF are generated in at least some embodiments, as shown in FIG. 7A. In this case, the light point LP generated by the optical scanning device 30 is located between the two or between the three light spots LF.

In at least some embodiments using two or three light spots LF, the position of the roughness measurement probe 15 is adjusted relative to the surface F (by moving at least one NC-controlled axis) so that the light spots LF have an equidistant distance to a reference line or plane B. FIG. 7A shows a surface F that has no artifacts or objects in the macroscopic range. By moving the at least one NC-controlled axis, the roughness measurement probe 15 was positioned so that the reference line or reference plane B extends parallel to the surface F. Once this position has been reached (referred to here as the equidistant position), the optical scanning device 30 can be used to scan a smaller area of the surface F.

In the embodiment example of FIG. 6, a chromatic confocal sensor device is used as optical scanning device 30, which comprises a light source 23 for emitting white light, a lens arrangement 24 for different focusing of different wavelength ranges of the white light, and a spectrometer 25, which is designed for evaluating light of at least one wavelength reflected from the surface F. The optical scanning device 30 is a chromatic confocal sensor device.

FIG. 7B shows a different snapshot. The roughness measurement probe 15 of FIG. 7A is now located above a surface F that has clearly visible artifacts or objects in the macroscopic range. Here, too, the controller sets an equidistant position by moving the at least one NC-controlled axis accordingly. FIG. 7B clearly shows the integrating function of the integratingly operating device 20. The integratingly operating device 20 seeks to adjust the mean distance between macroscopic artifacts or objects. In the example shown, the reference line or reference plane B was inclined slightly so that the same distance applies to both light spots LF. Once this position has been reached (referred to here as the equidistant position), the optical scanning device 30 can be used to scan a smaller area of the surface F again.

In principle, the virtual skid replaces the intermediate or integrating function of the mechanical skid 21 of the above-described embodiments, wherein in the case of the virtual skid a controller takes over part of the function for interaction with at least one NC-controlled axis.

Figure 8:
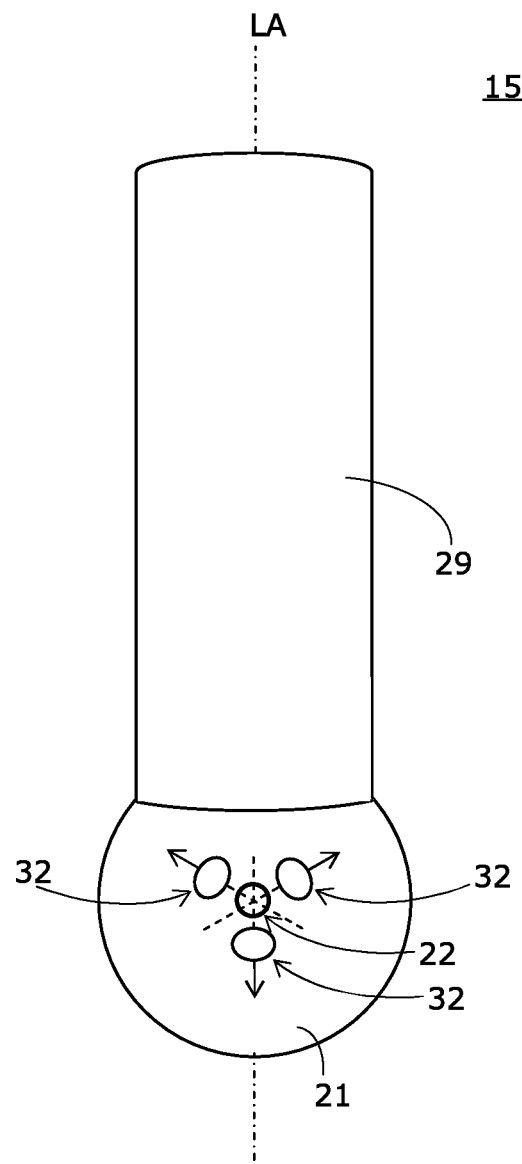
FIG. 8 schematically shows a view of the front part of a roughness measurement probe comprising a probe arm, in the end portion of which a virtual skid and an optical scanning device are integrated.

Three light spots LF are generated in at least some embodiments. FIG. 8 shows a view of the front part of a corresponding embodiment. The roughness measurement probe 15 of FIG. 8 comprises a probe arm 29 (which can be hollow inside, e.g. like arm 6 in FIG. 6). At its extreme end, a sphere 21 is provided here. This sphere 21 has at its lowest point (FIG. 8 shows the sphere from below) an aperture 22, which serves to emit and receive the light beam LS of the optical scanning device 30. In a mutual angular distance of 120 degrees, three further apertures 32 are arranged concentrically to aperture 22. These three apertures 32 serve to generate one light spot LF each, as described in connection with FIGS. 7A and 7B. The three light spots LF allow the equidistant positioning of a reference plane B relative to the surface F.

The sphere 21 can be used as a mechanical skid 21 if required, as described above. The sphere 21 can also be held in an equidistant position above the surface F by using a controller and at least one NC-controlled axis, as well as by emitting and evaluating three LF light spots.

Figure 9:
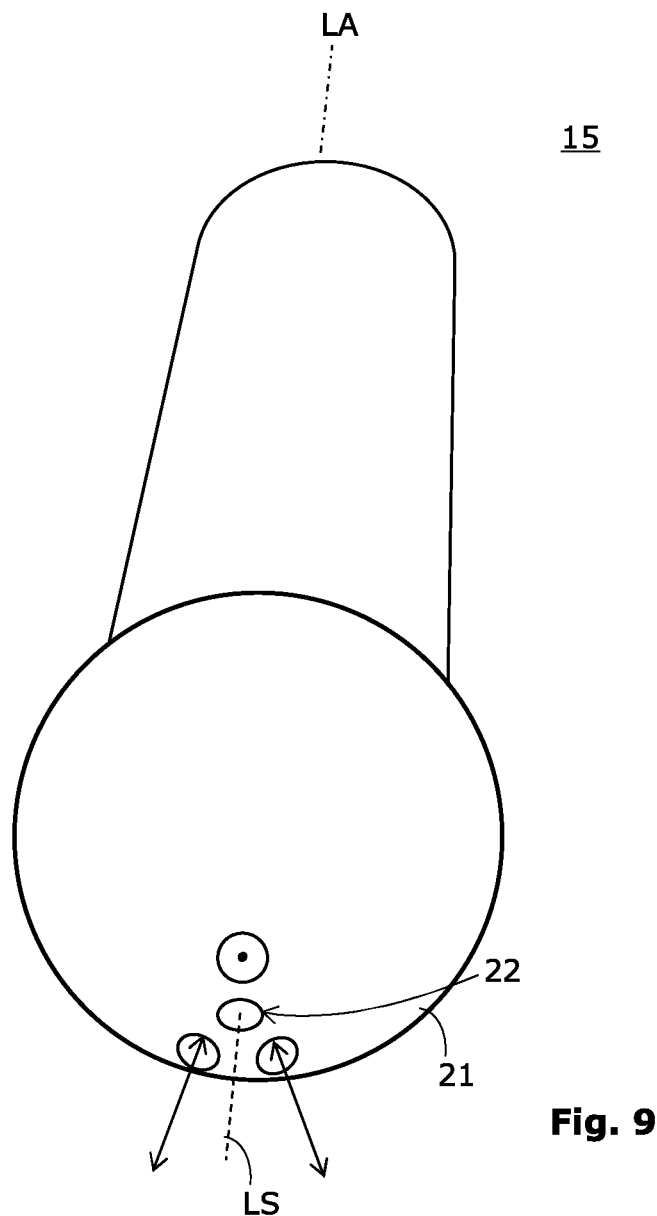
FIG. 9 schematically shows a view of the front part of a roughness measurement probe comprising a probe arm, in the end portion of which a virtual skid and an optical scanning device are integrated.

Three light spots LF are generated in at least some embodiments. FIG. 9 shows a view of the front part of another corresponding embodiment. The roughness measurement probe 15 of FIG. 9 comprises a probe arm 29 (which can be hollow inside, e.g. like arm 6 in FIG. 6). At its extreme end, a sphere 21 is provided here. This sphere 21 has an aperture 22 at its foremost point (FIG. 9 shows the sphere obliquely from above), which serves to emit and receive the light beam LS of the optical scanning device 30. The light beam LS here, in at least some embodiments, runs parallel to the longitudinal axis LA.

In a mutual angular distance of 120 degrees, three further apertures 32 are arranged concentrically to aperture 22. These three apertures 32 serve to generate one light spot LF each, as described in connection with FIGS. 7A and 7B. The three light spots LF allow the equidistant positioning of a reference plane B relative to the surface F. Also in this case the light point LP, which is generated by the optical scanning device 30, lies between the three light spots LF.

The roughness measurement probe 15 of FIG. 9 is guided over the surface F more like a stylus. The roughness measurement probe 15 of FIG. 8, on the other hand, is pulled or pushed over the surface F rather flat or at a slight angle.

In at least some embodiments, the roughness measurement probe 15 is arranged on a fully automatic, CNC-controlled measuring device 10. The measuring device 10 (here also referred to as coordinate measuring system 10) is, for example, suitable for testing the surface roughness, shape or geometry of spur-gear toothings as well as cutting and shaving gears, worms and worm gears, hobs, bevel gears and general dimension, shape and position deviations on rotationally symmetric components 11, for cam and camshaft measurement or also for rotor measurement, to name just a few possible applications, which are understood not to be limiting.

Figure 10:
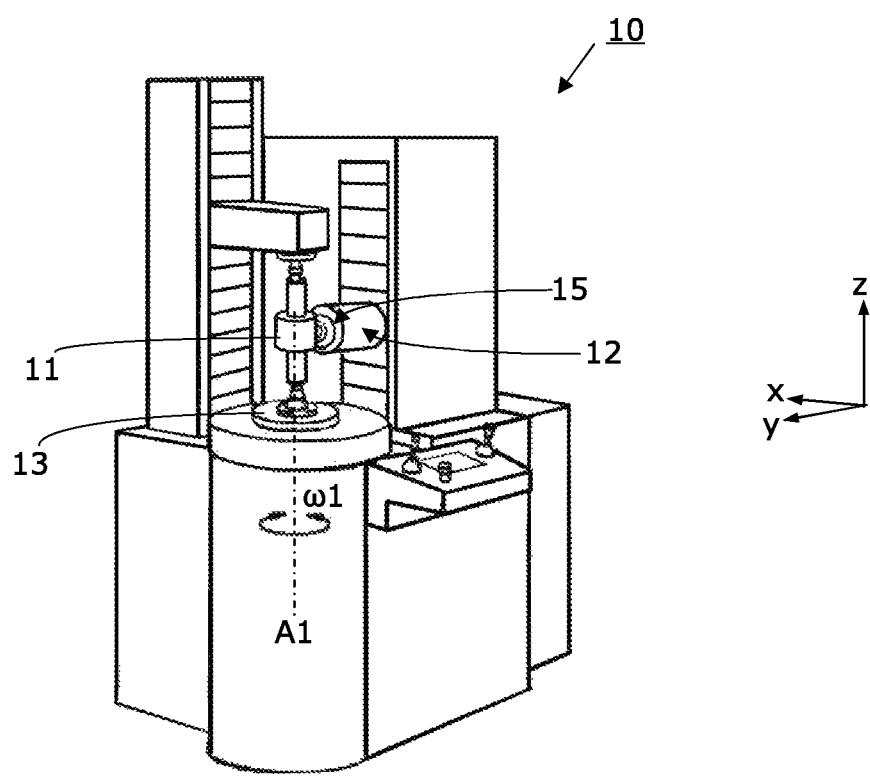
FIG. 10 shows a perspective view of a device (here in the form of a coordinate measuring system) equipped with a roughness measurement probe.

The coordinate measuring system 10 comprises a driver 13 which can be driven via a control (not visible) for picking/holding the component 11 to be measured, as shown in FIG. 10 by means of a stylized cylindrical wheel 11.

The coordinate measuring system 10 comprises, as shown in FIG. 10, at least one roughness measurement probe 15 for one-dimensional, two-dimensional or three-dimensional measurement of the component 11 clamped in the coordinate measuring system 10. In at least some embodiments, a probe system 12 with (spring) parallelogram construction is provided, which can be displaced in height (parallel to the z-axis). In addition, the roughness measurement probe 15 can carry out further feed movements (in at least some embodiments a controller, for example, a 4-axis path controller, of the coordinate measuring system 10 is used here). If necessary, a rotary movement $\omega 1$ around the A1 axis of the coordinate measuring system 10 can be carried out.

If the roughness measurement probe 15 is used, the skid 21 can be connected to the parallelogram structure of the probe system 12—in the case of embodiments with skid 21—in order to generate signals which enable a statement to be made about the macroscopic details of the surface F. At the same time, the optical scanning device 30 can generate signals that provide information about the microscopic details of the surface F.

When using the roughness measurement probe 15 with virtual skid, one or more of the NC-controlled axes of the coordinate measuring system 10 can be used to define an equidistant position. As soon as an equidistant position is reached, the optical scanning device 30 can generate signals that allow a statement to be made about the microscopic details of the surface F.

Further details on the exact functionality of the coordinate measuring system 10 can be found in the published patent application EP 2199732 A1.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A surface roughness measurement probe, comprising:
   an integratingly operating device including an optical arrangement defining a virtual skid, configured to image a light spot on a surface, and configured to scan the surface so as to maintain a mean distance between the surface roughness measurement probe and a first portion of the surface; and
   an optical scanning device located on or in the integratingly operating device and configured to optically scan a second portion of the surface that is smaller than the first portion in a contactless manner.

2. The surface roughness measurement probe according to claim 1, wherein the surface roughness measurement probe defines a reference line or reference plane thereof positionable substantially equidistantly or parallel relative to the surface, and the optical arrangement is configured to image at least two light spots on the surface when the reference line or reference plane of the surface roughness measurement probe is positioned substantially equidistantly or parallel relative to the surface.

3. The surface roughness measurement probe according to claim 1, wherein the surface roughness measurement probe defines a reference line or reference plane thereof positionable substantially equidistantly or parallel relative to the surface, and the optical scanning device is configured to optically scan the second portion of the surface in a contactless manner when the reference line or reference plane is positioned substantially equidistantly or parallel relative to the surface.

4. The surface roughness measurement probe according to claim 1, further comprising a controller configured to, when the surface roughness measurement probe is moved relative to the surface, maintain the surface roughness measurement probe at a substantially equidistant position relative to the surface.

5. The surface roughness measurement probe according to claim 1, wherein the optical scanning device defines a chromatic confocal sensor device comprising:
   a light source configured to emit white light,
   a lens arrangement configured to differently focus different wavelength ranges of the white light, and
   a spectrometer configured to evaluate light of at least one wavelength reflected from the surface.

6. The surface roughness measurement probe according to claim 1, wherein the optical scanning device is configured to operate according to a triangulation principle and comprises a laser light source configured to emit a light beam and a detector located at a position suitable to receive light of the light beam reflected by the surface.

7. The surface roughness measurement probe according to claim 6, wherein the optical scanning device comprises one or more of a lens, a mirror, or a prismatic optical element.

8. The surface roughness measurement probe according to claim 1, wherein the optical scanning device is configured to emit a light beam in a direction perpendicularly, obliquely or parallel to a longitudinal axis of the surface roughness measurement probe.

9. A coordinate measuring system comprising:
a surface roughness measurement probe comprising
   an integratingly operating device including an optical arrangement defining a virtual skid, configured to image a light spot on a surface, and configured to scan the surface so as to maintain a mean distance between the surface roughness measurement probe and a first portion of the surface; and
   an optical scanning device located on or in the integratingly operating device and configured to optically scan a second portion of the surface that is smaller than the first portion in a contactless manner; and
at least one NC-controlled axis configured to move the surface roughness measurement probe relative to a surface of a component.

10. A method comprising:
measuring the surface roughness of tooth flanks of gears using a surface roughness measurement probe including:
   an integratingly operating device including an optical arrangement defining a virtual skid, configured to image a light spot on a surface, and configured to scan the surface so as to maintain a mean distance between the surface roughness measurement probe and a first portion of the surface; and
   an optical scanning device located on or in the integratingly operating device and configured to optically scan a second portion of the surface that is smaller than the first portion in a contactless manner;
wherein the method includes transmitting a light beam using the optical scanning device in a direction toward one of the tooth flanks so that light of the light beam reflects off said one of the tooth flanks in a direction toward the optical scanning device.

* * * * *